United States Patent [19]

Noren

[11] 4,277,690
[45] Jul. 7, 1981

[54] PLANT FOR UTILIZING KINETIC ENERGY

[76] Inventor: Sven A. Noren, Klövervägen 3, Bromma, Sweden, S-161 36

[21] Appl. No.: 64,351

[22] Filed: Aug. 7, 1979

[30] Foreign Application Priority Data

Aug. 16, 1978 [SE] Sweden .............................. 7808679

[51] Int. Cl.³ ............................................. F03B 13/12
[52] U.S. Cl. ....................................... 290/53; 60/497; 60/501; 60/502; 290/42; 417/61; 417/100; 417/333
[58] Field of Search ................... 290/53, 42, 54, 43; 60/495, 497, 575, 389, 501, 502, 505; 417/61, 77, 85, 100, 330–333, 337; 415/7

[56] References Cited

U.S. PATENT DOCUMENTS

| 1,864,499 | 6/1932 | Grigsby | 60/507 |
| 3,487,228 | 12/1969 | Kriegel | 60/497 |
| 3,783,302 | 1/1974 | Woodbridge | 290/42 |
| 3,870,893 | 3/1975 | Mattera | 290/53 |
| 4,103,490 | 8/1978 | Gorlov | 417/100 |
| 4,208,878 | 6/1980 | Rainey | 290/53 |

FOREIGN PATENT DOCUMENTS 2406756 5/1975 Fed. Rep. of Germany ............ 290/53

1530318 10/1978 United Kingdom ..................... 290/53

Primary Examiner—J. V. Truhe
Assistant Examiner—Shelley Wade
Attorney, Agent, or Firm—Larson, Taylor and Hinds

[57] ABSTRACT

A plant for utilizing kinetic energy inherent in the wave movement of water or heaving of the sea. The plant comprises a float unit and energy absorption apparatus connected to the unit. The absorption apparatus comprises an immersed piston built into an elongate acceleration pipe, which is open at both ends and substantially vertical, this pipe being connected to the float unit and accompanying it in the wave motion of the water.

The piston is connected to a hydraulic motor driving an electric generator.

The piston is arranged in a portion with extended cross section upwards in the acceleration pipe.

Coupled between the piston and hydraulic motor there is a hydraulic cylinder with a double-sided piston, and a rectifying hydraulic circuit for always supplying hydraulic pressure to the same side of the hydraulic motor.

A flywheel can be connected between the hydraulic motor and generator for smoothing out the action of pressure variations on the generator.

5 Claims, 2 Drawing Figures

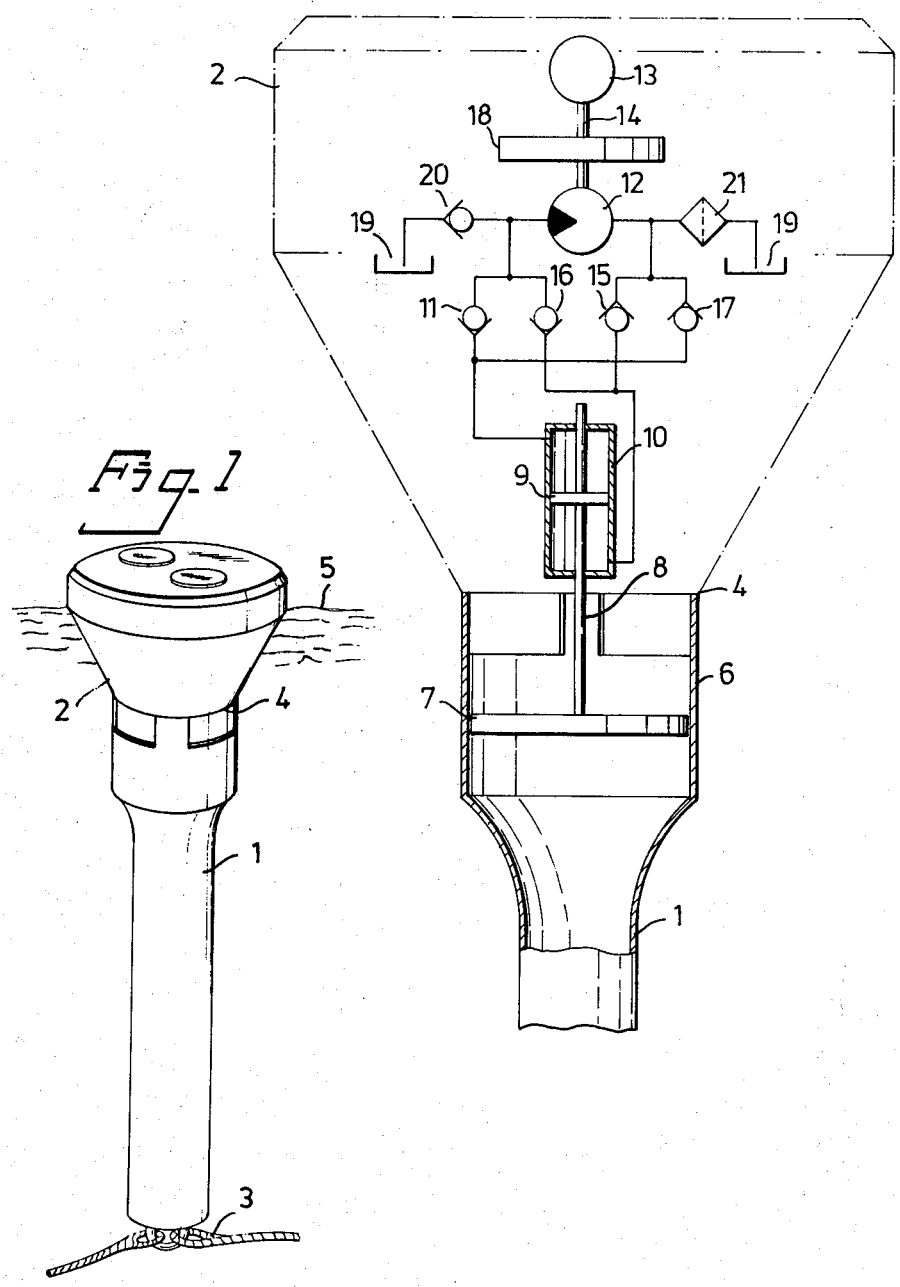

PLANT FOR UTILIZING KINETIC ENERGY

The present invention relates to plant for utilizing kinetic energy inherent in the wave movement of water or the heaving of the sea. Such plant comprises at least one float unit at the water surface and anchored in such a way that it can move freely, without limitation in conjunction with the wave movement, and substantially vertically. The plant has at least one movement-inhibiting and energy-absorption apparatus connected to the float unit.

Systems of turbine wheels or so-called runners are used in known plants for utilizing the kinetic energy inherent in the wave movement of water, but due to the comparatively low flow rates these give low power per unit surface of the energy-absorption system. If the utilization of greater amounts of energy is to be enabled, the plant must be given large dimensions and this results in high investment costs as well as difficult handling.

A not inconsiderable improvement of the power per unit surface can be obtained with a runner system provided with inlet and outlet hoppers of the venturi type, which give a velocity increase in the runner cross section. Such an arrangement can give a power increase of 5 to 10 times, but the power per unit surface is however too low in relation to the costs of the structure and for enabling use other than in special cases where investment and running costs are of minor importance.

A further improvement in efficiency can be obtained if the runners are built into an acceleration pipe executing a vertical oscillating motion. The enclosed liquid column or head is given an accompanying movement due to the flow resistance offered by the runners and by any restriction of the pipe area which may possibly be arranged. If, for example, the tube with its fixedly mounted turbine unit is accelerated upwards, there is an excess pressure under the liquid column lying above the runner and a subpressure above the liquid column under the runner. The sum of these pressures gives the driving force to the runner. The pressure difference $\Delta p$ will be $$\Delta P = \rho \cdot l \cdot a$$

where
$\rho$ = density of the water
$l$ = total length of the pipe
$a$ = water column acceleration.

For a wave with a height of 2 meters, the maximum acceleration will be about 1 m/sec.$^2$. A pipe 25 m long will then give rise to a pressure difference of 25000 N/m$^2$. This corresponds to a hydraulic turbine plant with a head of 2.5 m. For the sake of comparison, it can be mentioned that a runner oscillated up and down in open water in a similar way can only utilize the dynamic pressure, which will be at a maximum of about 500 N/m$^2$ for the assumed wave height of 2 m. This corresponds to a head of only 0.05 m.

The introduction of an acceleration pipe with reasonable dimensions can thus increase the power output 50 times for a given size of turbine. Put in different words, the turbine diameter can be reduced to 1/7th for the same power output in the comparison given above.

Since the runner in this plant can operate at higher speed than other known plants of this kind it can be given smaller dimensions, which facilitates the constructive configuration of the plant at the same time as manufacturing costs for it can be reduced.

The present invention has the object of providing a plant for utilizing the wave energy in water, enabling a more efficient and uniform reception of energy and energy conversion than what has been possible with the plant of this kind known up to now.

The characterizing features of the invention are apparent from the patent claims.

The invention is described in detail in the following with reference to the accompanying drawing, on which an embodiment of the invention is chematically illustrated as an example.

FIG. 1 illustrates in perspective a plant in accordance with the invention with float unit and acceleration pipe.

FIG. 2 is a longitudinal section of the upper part of the plant in FIG. 1, schematic hydraulic circuits built into the float unit also being shown.

The plant illustrated in FIG. 1 mainly consists of an acceleration pipe 1 and a float unit 2 anchored to the bottom by means of moorings 3. The buoyancy of the float unit 4 is so dimensioned, and the length of the acceleration pipe 1 so adjusted that the upper end 4 of the pipe 1 is under the water surface 5.

The upper part of the pipe 1 is shown in section in FIG. 2, which also schematically illustrates the hydraulic circuits of the plant inside the float unit 2. At its upper end, the pipe 1 has a portion 6 with increased cross section, in which there is accommodated an immersed piston 7 which is moved up and down inside the portion 6 by the water column inside the pipe 1. Via a piston rod 8, the piston 7 is connected to the piston 9 in a hydraulic cylinder 10. The piston rod 8 is thus common for pistons 7 and 9, and goes through both end walls of the cylinder 10. The pistons 7 and 9 thus move parallel to each other, with the movement of the latter forcibly controlled by the piston 7. When the water column in the pipe 1 lifts the piston 7, the piston 9 is displaced upwardly inside the cylinder 10 at the same rate, hydraulic liquid flowing from the upper cylinder half through the non-return valve 11 driving the hydraulic motor 12. The motor 12 is connected to an electric generator 13 via a shaft 14. The hydraulic liquid returns to the lower cylinder half via the non-return valve 15. When the water column in the pipe 1 begins to pull down the piston 7, i.e. when the latter reverses, the piston 9 also reverses and the valve 11 is closed. Hydraulic liquid will not flow from the lower cylinder half via the non-return valve 16 to the hydraulic motor 12 and drive this in the same direction. The hydraulic liquid returns to the upper cylinder half via the non-return valve 17. In order to smooth out the action of volumetric flow variations of the hydraulic liquid on the rpm of the generator 13, especially on the occasions when the pistons 7, 9 reverse, the shaft 14 is provided with a flywheel 18. With the same object, the hydraulic circuit is also provided with an overflow tank or reservoir 19 and a non-return valve 20 between the tank and motor, which is open as soon as the volume flow from the cylinder 10 falls below the volume flow maintained through the motor by reason of the flywheel 18. The circuit then has idling circulation until the cylinder 10 increases its volume flow to come abreast with the volume flow through the motor 12. It is also possible to connect the flywheel 18 by means of a free wheel to the motor 12, which results in small losses, but has the disadvantage that a pressure shock occurs when the motor comes into operation and its speed comes up to that of the flywheel. A filter 21 is positioned between the output side of the motor and the reservoir 19.

To further reduce speed variations of the generator, the hydraulic motor can have a variable displacement and be pressure-compensated, so that its displacement decreases when the volume flow from the cylinder tends to decrease. The operation of the generator can thereby continue for a further portion of the working cycle, without the non-return valve 20 needing to open.

To obtain optimum utilization of the wave energy, the following conditions should be met.

1. The pipe length is greater than half the wave length.

2. $(A_1/A_2)^2 h_A/2l = 0.5 - 3$ where
$A_1$ = the pipe area
$A_2$ = the equivalent constriction area, i.e. the area of a constriction placed in the pipe which gives the same retardation of the oscillating liquid column as the actual energy absorption means.
$h_A$ = half the wave height, i.e. the wave amplitude
$l$ = the pipe length

What I claim is:

1. Plant for utilizing kinetic energy inherent in the wave movement of water or heaving of the sea, comprising a float unit and a depending energy absorption apparatus connected to the float unit, characterized in that the energy absorption apparatus comprises an immersed piston built into an elongate, substantially vertical acceleration pipe, said pipe comprising a cylinder for said piston and being open at both ends and normally submerged beneath the float unit when in use, said pipe being connected to the float unit and accompanying the float unit in the wave movement of the water, said piston being reciprocable in said pipe in response to hydraulic pressure forces on its upper and lower faces, and being unrestrained exteriorly of the plant against movement with or relative to said pipe.

2. Plant as claimed in claim 1, characterized in that the piston is drivingly coupled to a hydraulic motor driving an electric generator.

3. Plant as claimed in claim 1, characterized in that the piston is arranged in a portion with extended cross section, upwards in the acceleration pipe.

4. Plant as claimed in claim 2, characterized in that a hydraulic cylinder is coupled between the piston and hydraulic motor, said hydraulic cylinder having a double-sided piston and a rectifying hydraulic circuit for always supplying hydraulic pressure to the same side of the hydraulic motor.

5. Plant as claimed in claim 4, characterized in that a flywheel is connected between the hydraulic motor and generator for smoothing out the effect of pressure variations on the generator.

* * * * *